United States Patent [19]

Herbst et al.

[11] Patent Number: 4,787,967

[45] Date of Patent: Nov. 29, 1988

[54] PROCESS FOR TWO-PHASE FLUID CATALYTIC CRACKING SYSTEM

[75] Inventors: Joseph A. Herbst, Turnerville; Hartley Owen, Belle Mead, both of N.J.; Paul H. Schipper, Wilmington, Del.

[73] Assignee: Mobil Oil Corporation, New York, N.Y.

[21] Appl. No.: 903,367

[22] Filed: Sep. 3, 1986

[51] Int. Cl.$^4$ .................... C10G 51/04; C10G 11/18
[52] U.S. Cl. .................... 208/74; 208/113; 208/157; 208/72; 208/120
[58] Field of Search ............... 208/163, 164, 113, 161, 208/152, 153, 74–78, 120, 157

[56] References Cited

U.S. PATENT DOCUMENTS

| | | | |
|---|---|---|---|
| 2,515,155 | 7/1950 | Munday | 208/161 X |
| 3,617,497 | 11/1971 | Bryson | 208/80 |
| 3,748,251 | 7/1973 | Demmel et al. | 208/74 |
| 3,758,403 | 9/1973 | Rosinski et al. | 208/120 |
| 3,847,793 | 11/1974 | Schwartz et al. | 208/74 X |
| 3,856,659 | 12/1974 | Owen | 208/80 |
| 3,894,931 | 7/1975 | Nace et al. | 208/73 |
| 3,894,934 | 7/1975 | Owen et al. | 208/78 |
| 3,926,778 | 12/1975 | Owen et al. | 208/74 |
| 3,926,843 | 12/1975 | Owen | 252/417 |
| 4,035,285 | 7/1977 | Owen et al. | 208/120 |
| 4,116,814 | 9/1978 | Zahner | 208/78 |
| 4,118,337 | 9/1978 | Gross et al. | 208/113 X |
| 4,146,465 | 3/1979 | Blazek, Sr. et al. | 208/120 |
| 4,325,833 | 4/1982 | Scott | 252/417 |
| 4,331,533 | 5/1982 | Dean et al. | 208/113 |
| 4,336,160 | 6/1982 | Dean et al. | 252/417 |
| 4,404,095 | 9/1983 | Haddad et al. | 208/161 |
| 4,427,537 | 1/1984 | Dean et al. | 208/120 |
| 4,444,722 | 4/1984 | Owen | 422/144 |
| 4,481,103 | 11/1984 | Krambeck et al. | 208/120 |
| 4,490,241 | 12/1984 | Chou | 208/75 |
| 4,502,947 | 3/1985 | Haddad et al. | 208/161 |
| 4,605,491 | 8/1986 | Haddad et al. | 208/164 X |
| 4,717,466 | 1/1988 | Herbst et al. | 208/113 |
| 4,749,470 | 6/1988 | Herbst et al. | 208/85 |
| 4,752,375 | 6/1988 | Herbst et al. | 208/74 |

Primary Examiner—Glenn Caldarola
Attorney, Agent, or Firm—Alexander J. McKillop; Michael G. Gilman; Marina V. Schneller

[57] ABSTRACT

A fluid catalytic cracking (FCC) process and apparatus which employs relatively more elutriatable catalyst particles comprising intermediate pore zeolite, particularly ZSM-5, and relatively less elutriatable catalyst particles comprising large pore zeolite, preferably zeolite Y. The process and apparatus employ a first stripping vessel which also separates a more elutriatable first portion of catalyst from a less elutriatable second portion of catalyst. The more elutriatable first portion passes to a second stripping vessel, and subsequently recycles to a fluid catalytic cracking reactor riser. The second portion of less elutriatable catalyst passes from the first stripping vessel to a fluid catalytic cracking regenerator vessel and, after being regenerated, recycles to the reactor riser. The more elutriatable first portion contains a higher ratio of intermediate pore catalyst particles to large pore catalyst particles than does the second portion. Also disclosed is an apparatus for separating more elutriatable particles from less elutriatable particles which employs a vessel and concentric cylinders.

13 Claims, 4 Drawing Sheets

PROCESS FOR TWO-PHASE FLUID CATALYTIC CRACKING SYSTEM

BACKGROUND OF THE INVENTION

1. Field of the Invention

This invention relates to a process and apparatus for fluid catalytic cracking a hydrocarbon feed utilizing a mixture of large pore zeolite cracking catalyst particles and intermediate pore zeolite cracking catalyst particles. More particularly, the present invention relates to a process and apparatus which separates more elutriatable particles, which are predominantly intermediate pore zeolites, from less elutriatable particles, which are predominantly large pore zeolites.

2. Discussion of the Prior Art

In known and conventional catalytic cracking processes, a hydrocarbon feedstock, such as gas oil, is cracked in an elongated reactor riser, at elevated temperature, to provide a mixture of lighter hydrocarbon products. Suitable cracking catalysts include large pore crystalline zeolites, such as zeolite X or Y, and intermediate pore crystalline zeolites, such as ZSM-5. The products of the reaction, together with catalysts, are discharged into a separator located within an enclosed stripping vessel, with the spent catalyst flowing downwardly therein. Prior to transfer to a catalyst regenerator unit, entrained hydrocarbon product is removed from the spent catalyst by means of a stripping gas, such as steam or nitrogen. Following regeneration, the catalyst is reintroduced into the riser to participate in another cycle of operation. Fluid catalytic processes are described in U.S. Pat. Nos. 3,617,497 to Bryson et al and 4,219,407 to Haddad et al.

It is known to catalytically crack hydrocarbons with mixtures of ZSM-5 and other zeolites, as disclosed in U.S. Pat. No. 3,758,403 to Rosinski et al and incorporated herein by reference. Rosinski et al treat the ZSM-5 and the other catalysts equally by sending all the catalyst from a reactor to a regenerator. Thus, Rosinski et al do not recognize or take advantage of differences between ZSM-5 and other zeolites.

It would be desirable to provide a process and apparatus which employs large pore zeolite catalysts and intermediate pore zeolite catalysts and regenerates large pore zeolite catalysts more than intermediate pore zeolite catalysts. This is due to the fact that intermediate pore zeolite catalysts do not deactivate with coke formation as rapidly as large pore zeolites.

By segregating the intermediate pore zeolite catalysts, they are exposed to less hydrothermal degradation of catalyst when hydrogen-containing components, such as coke, adhering to catalyst passing from the fluid catalytic cracking stripper to the fluid catalytic cracking regenerator, react with oxygen in the regenerator to form water. This will result in less intermediate pore zeolite catalyst makeup required to achieve the desired results.

U.S. Pat. No. 4,336,160 to Dean et al attempts to reduce hydrothermal degradation by staged regeneration. However, Dean et al send all the catalyst from a reactor to a regenerator, thus providing opportunity for hydrothermal degradation.

It would be desirable to provide a process and apparatus which avoids sending a catalyst, such as intermediate pore zeolite catalysts, unnecessarily to the regenerator. In most instances, the intermediate pore zeolite catalyst does not deactivate with the amount of coke on it from one pass through the riser. Sending this partially-coked, but still highly active, intermediate pore zeolite catalyst unnecessarily to the regenerator results in unnecessary hydrothermal degradation of the intermediate pore zeolite catalyst in the regenerator.

SUMMARY OF THE INVENTION

It is one object of the present invention to provide an improved fluid catalytic cracking process and apparatus which separates a major fraction of intermediate pore zeolite catalyst from large pore zeolite catalyst prior to catalyst regeneration.

It is another object to provide a process and apparatus which decreases hydrothermal degradation of cracking catalysts.

It is another object to provide a process and apparatus to more effectively utilize ZSM-5 without having to pass the ZSM-5 into a fluid catalytic cracking regenerator.

It is another object to provide an apparatus for separating more elutriatable particles from less elutriatable particles by countercurrently contacting a particle stream with a stripping gas.

In its process aspects, the present invention provides a fluid catalytic cracking system which passes a mixture of particles comprising intermediate pore zeolite catalysts, particles comprising large pore zeolite catalysts, and hydrocarbons at fluid catalytic cracking conditions upwardly through a riser. The intermedidate pore zeolite (preferably ZSM-5) catalyst particles are more elutriatable than the large pore zeolite catalyst (preferably zeolite X or Y) particles. The intermediate pore zeolites are more elutriatable by having a smaller average particle diameter, more regularly shaped by being less dense, or a combination of these parameters, relative to the large pore zeolite particles. The mixture discharges from the riser and the catalyst of the mixture and any entrained hydrocarbons pass into a first stripper where the entrained hydrocarbons, and more elutriatable catalyst, are separated from the mixture. The less elutriatable particles pass downwardly through the first stripper and discharge from the stripper into a fluid catalytic cracking regenerator. The more elutriatable particles pass to a second stripper and then recycle to the riser. After regeneration, the less elutriatable particles recycle to the riser.

The present invention has advantages because it sends large pore zeolite catalyst to regeneration, but avoids unnecessarily sending intermediate pore zeolite catalyst particles to regeneration, and thus avoids hydrothermal degradation.

In its apparatus aspects, the present invention includes a reactor riser for passing a mixture of intermediate pore zeolite catalyst particles, large pore zeolite catalyst particles and hydrocarbons upwardly therethrough, a means for directing catalyst from the riser to a first means for stripping, wherein the means for stripping includes a means for separating more elutriatable particles from less elutriatable particles and passing the more elutriatable particles from the first means for stripping to a second means for stripping, and recycling the more elutriatable particles from the second means for stripping to the reactor riser. The first means for stripping continues to strip the less elutriatable particles after the more elutriatable particles have been separated. The apparatus further includes a regenerator for regenerating the stripped less elutriatable particles. The apparatus further comprises a means for recycling the less relutriatable particles from the regenerator to the reactor riser.

In its apparatus aspects, the present invention also includes a means for separating more elutriatable particles from less elutriatable particles. The apparatus is provided with a stripping vessel and means for injecting strippng gas into the vessel to countercurrently contact a mixture of these particles flowing downwardly through an annulus of the vessel to direct the more elutriatable particles into and upwardly through a first cylinder which is concentric with the vessel. Additional cylinders may be provided which are also concentric with the vessel. An upper portion of the additional cylinders may be inserted into the first cylinder. The more elutriatable particles would then pass upwardly through the interior of the cylinders. A conduit may be attached to a top portion of the first cylinder and be in communication with the upper portion of the cylinders to pass the more elutriatable catalyst out of the cylinders and out of the vessel. Preferably, perforated trays attached to vessel sidewalls, and perforated trays attached to the cylinders, are located within the stripping vessel. The stripping vessel also comprises a catalyst inlet port at a top portion of the vessel and a less elutriatable catalyst exit port at a lower portion of the vessel.

BRIEF DESCRIPTION OF THE DRAWINGS

The above and other objects, advantages and features of the present invention will be more fully understood when considered in conjunction with the following drawings, of which.

DETAILED DESCRIPTION OF THE INVENTION

Figure 1:
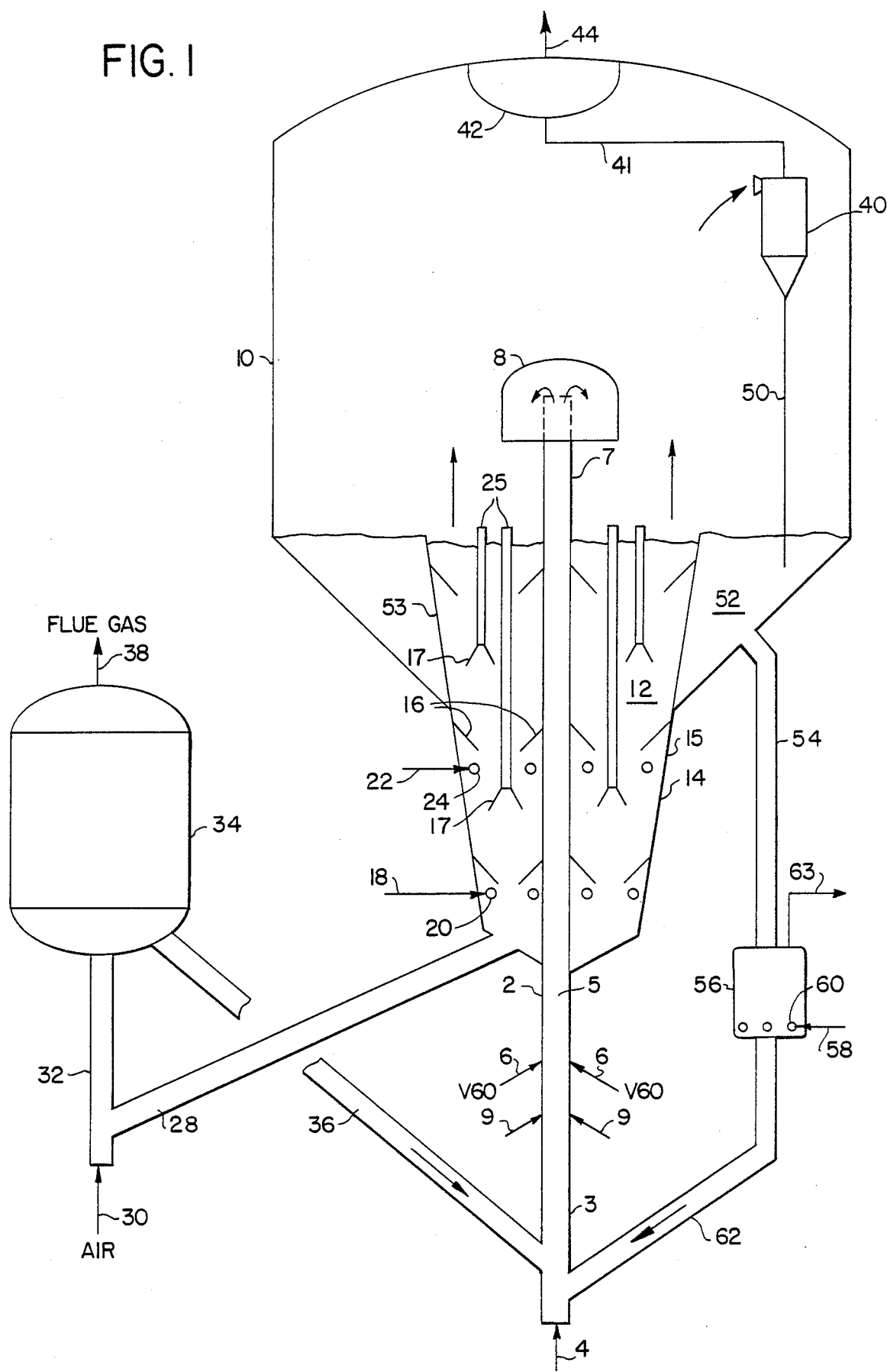
FIG. 1 illustrates a schematic diagram of a fluid catalytic cracking reactor and regenerator of a first embodiment of the present invention.

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally-occurring zeolites, such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and-/or large pore crystalline cracking catalysts as the first catalyst component of the mixed catalyst system. It is further contemplated that the entire mixed catalyst system can be made up solely of two or more amorphous and/or large pore crystalline silicate cracking catalysts, provided at least one catalyst requires frequent regeneration (the first catalyst component) and other catalyst in the system needs regeneration only on a relatively infrequent basis (the second catalyst component). Thus, for example, a mixed catalyst system in accordance with the invention can be made up of zeolite Y, a catalyst which requires frequent regeneration, but is fairly stable under the conditions prevailing in the regenerator, and Zeolite Beta, a catalyst whic need not be regenerated as frequently as zeolite Y. Preferred large pore crystalline silicate zeolite components include the synthetic zeolites mordenite and faujasite and the synthetic zeolites X and Y, with particular preference being accorded zeolites Y, REY, USY and RE-USY and mixtures thereof.

The shape-selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48, and other similar materials. U.S. Pat. No. 3,702,886, describing and claiming ZSM-5, is incorporated herein by reference. Also, U.S. Reissue Pat. No. 29,948, describing and claiming a crystalline material with an X-ray diffraction pattern of ZSM-5, is incorporated herein by reference, as is U.S. Pat. No. 4,061,724, describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,375,373, the entire contents of which are incorporated herein by reference.

The preferred shape-selective medium pore crystalline silicate zeolite components of the mixed catalyst system herein are ZSM-5, ZSM-11, ZSM-12, ZSM-23, ZSM-35 and ZSM-38, with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and, in general, any trivalent metal which is heavier than aluminum. Specific examples of such catalysts include ZSM-5 and Zeolite Beta containing boron, gallium and/or titanium In lieu of, or in addition to, being incorporated into the zeolite framework, these and other catalytically active elements can also be deposited upon the zeolite by any suitable procedure, e.g., impregnation.

Separation of particles of first catalyst component from particles of second catalyst component in the stripping unit can be accomplished in several ways. For example, the two components can be provided in such different average particle sizes that they can be readily sorted within a stripping unit possessing suitable sieving means.

Separation within the stripping zone can also be achieved by classifying the first and second catalyst components according to their average particle densities, which can be made to be significantly different in various ways, including by appropriate selection of the matrix components with which they are composited, as more fully explained below.

The characterizing physical properties of the first and second catalyst components are so selected that they each will exhibit different settling rates, designated $R_1$ and $R_2$, respectively, which permit the catalyst particles having the greater settling rate (advantageously, the catalyst requiring frequent regeneration) to separate from the catalyst particles having the lower settling rate. Then, the separated catalyst requiring frequent regeneration is sent to a regenerator. Residency time of catalyst particles in a fluidized stripping zone is primarily dependent on two factors: the linear velocity of the fluid stream within the stripping zone which tends to carry the entire catalyst bed/conversion products/unconverted feed up and out of the stripping zone, and the opposing force of gravity which tends to pull the slower moving catalyst particles downwardly through the stripping zone. Ordinarily, in a mixed catalyst system, both catalyst components will circulate through the system at about the same rate. As previously pointed out, this has proven disadvantageous to the efficiency of the system, since the medium pore zeolite or other catalyst component which does not require as frequent regeneration as the cracking catalyst will be needlessly subjected to the catalyst-degrading conditions of the regenerator, with the result that its useful catalytic life will be shortened. However, in accordance with this invention, it is possible to separate the catalysts and to divert the less coke deactivated catalyst away from the regenerator. To bring about this separation of a particular component of the mixed catalyst stream within the stripping zone, the average density, particle size and/or shape of the catalyst particles can be adjusted in a number of ways as to provide the desired settling characteristics.

Among the techniques which can be used for making one catalyst component more dense than the other is compositing each catalyst with a matrix component of substantially different density. Useful matrix components include the following:

| Matrix Component | Particle Density (gm/cm$^{-3}$) |
|---|---|
| Alumina | 3.9–4.0 |
| Silica | 2.2–2.6 |
| Magnesia | 3.6 |

| Matrix Component | Particle Density (gm/cm$^{-3}$) |
|---|---|
| Beryllia | 3.0 |
| Barium Oxide | 5.7 |
| Zirconia | 5.6–5.9 |
| Titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be less dense than the catalyst requiring frequent regeneration. For example, in the case of a mixed catalyst system containing medium pore and large pore crystalline silicate zeolites, where it is desired to recycle the medium pore zeolite from the stripping zone to a riser conversion zone, the overall packed density of the medium pore zeolite particles, inclusive of its matrix component, can advantageously vary from about 0.4 to about 1.1 gm/cm$^3$, and preferably from about 0.6 to about 1.0 gm/cm$^3$, and the overall packed density of the large pore zeolite particles, inclusive of its matrix component, can advantageously vary from about 0.6 to about 4.0 gm/cm$^3$ density, and preferably from about 1.5 to about 3.0 gm/cm$^3$.

Another useful technique for adjusting the density of each catalyst component, again in the case of a mixture of medium and large pore zeolites, is to composite the large pore zeolite particles with a material which tends to coke up faster than the particles of medium pore zeolite, such resulting in an increase in the density of the former in situ. Illustrative of such materials are hydrated alumina which in situ forms a transition alumina which has a faster coking rate than, for example zeolite Y. Zeolite Y has a faster coking rate than ZSM-5. This embodiment possesses several additional advantages. In the coked-up state, the composited large pore silicate zeolite is more resistant to attrition, which results from collision with other particles in the riser. In addition, the coked-up composited large pore zeolite particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to have a greater settling rate than the smaller. Where it is desired to increase the elutriatability, say, of the medium pore zeolite particles over that of the large pore catalyst component, the average particle size of the former will usually be smaller than that of the latter. So, for example, the average particle size of the large pore zeolite particles can be made to vary from about 500 to about 70,000 microns, and preferably from about 100 to about 25,000 microns, while the average particle size of the medium pore zeolite particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the greater the settling rate. Irregular-shaped particles can be simply and readily achieved by crushing the catalyst-matrix extrudate or using an extruded catalyst.

As will be appreciated by those skilled in the art, the setting rate for a particular catalyst component will result from the interaction of each of the three foregoing factors, i.e., density, average particle size and particle shape. The factors can be combined in such a way that they each contribute to the desired result. For example, the particles of the more coke deactivated catalyst can simultaneously be made denser, larger and more irregular in shape than the catalyst particles not requiring frequent regeneration. However, a differential settling rate can still be provided, even if one of the foregoing factors partially offsets another, as would be the case where greater density and smaller average particle size co-exist in the same catalyst particle. Regardless of how these factors of particle density, size and shape are established for a particular catalyst component, their combined effect will, of course, be such as to result in a significant differential in settling rates of the components comprising the mixed catalyst system of this invention.

The shape-selective medium pore crystalline silicate zeolite catalyst can be present in the mixed catalyst system over widely varying levels. For example, the zeolite concentration of the second catalyst component can be present at a level as low as about 0.01 to about 1.0 wt % of the total catalyst inventory (as in the case of the catalytic cracking process of U.S. Pat. No. 4,368,114), and can represent as much as 25 wt % of the total catalyst system.

As shown in FIG. 1, a less elutriatable portion of catalyst from conduit 36 and a more elutriatable portion of catalyst from conduit 62 combine with a lift gas stream 4 in a fluid catalytic cracking reactor riser 2. The catalyst mixture comprises particles of a regenerated large pore crystalline zeolite cracking catalyst, most preferably zeolite X or Y, and particles of intermediate pore crystalline zeolite cracking catalyst, most preferably ZSM-5. Preferably, the intermediate pore crystalline zeolite particles contain a heavy metal, such as gallium or barium, or both, as part of its framework structure. Preferably, the lift gas contains olefins having 2 to 4 carbon atoms which react in riser 2. Some reactions of olefins in a fluid catalytic cracking reactor riser are more fully discussed in U.S. Pat. No. 3,894,931 to Nace et al, incorporated herein by reference.

The catalyst and lift gas form a mixture which passes upwardly through a first lower zone 3 of the riser 2 into a second higher zone 5 of the riser 2. Most preferably, the lift gas 4 contains ethylene, and an optional feedstream 9, comprising olefins having 3 to 4 carbon atoms, is injected into zone 3 of riser 2 downstream of where the lift gas 4 combines with catalyst. This is preferable to maximize the ethylene contact time, thereby promoting dimerization of the ethylene. A vacuum gas oil (VGO) stream 6 is added to the mixture in zone 5. Other hydrocarbon stocks suitable as feeds in stream 6 comprise petroleum fractions having an initial boiling point above 400° F., a 50% point range of at least 500° F. and an end point range of at least 600° F. Such hydrocarbon fractions include gas oils, thermal oils, residual oils, cycle stocks, whole top crudes, tar sand oils, shale oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure. The mixture then continues upwardly under catalytic cracking conditions, including a mixture temperature between about 900° and 1250° F., and is discharged at a downstream end 7 of the riser 2 which is located within a reactor vessel 10. Contacting catalyst and olefins from streams 4, 9 in zone 3 causes reactions such as dimerization and oligomerization and produces reactive molecular fragments which may subsequently react with cracked VGO in the riser 2. The mixture discharges from the riser 2 and contacts a riser cover 8, which downwardly directs the mixture into a catalyst bed 12 contained within a tapered catalyst stripping vessel 14 having frustoconical sidewalls 15.

As cracking takes place in riser 2, the accumulation of carbon in the pores of the large pore zeolite results in its deactivation. However, such is not the case with the intermediate pore zeolite, which is fairly resistant to coking and will retain its catalytic activity substantially intact as the fluid catalyst mixture and the products of cracking continue upwardly through the riser. The large pore zeolite is on less elutriatable particles, while the intermediate pore zeolite is on more elutriatable particles. The large pore particles are less elutriatable by having a greater density or average particle size diameter, or both. Employing an irregularly-shaped particle has directionally the same effect on elutriation as increasing particle size. An example of an irregularly-shaped particle is an extruded pellet or crushed pellet. An example of a regularly-shaped particle is a microsphere. Thus, the irregular particles are less elutriatable than regularly-shaped particles, having about the same particle density and hydraulic diameter. Furthermore, large pore particles become heavier, and accordingly less elutriatable, during processing because of the addition of coke, whereas there is less tendency to form coke on intermediate pore particles, such as ZSM-5. The difference in elutriation facilitates separation of the intermediate pore zeolite particles from the large pore zeolite particles downstream of the riser, as discussed below. This allows the intermediate pore zeolite particles to be stripped, bypass regeneration, and recycle directly from stripping to the reactor riser, while the large pore particles pass from a stripper to regeneration prior to recycle to the reactor riser, as also discussed below.

Stripping gas is provided to the first stripper 14 by stripping gas conduits 18, 22 attached to headers 20, 22, respectively, and passes upwardly through the bed 12, and countercurrently contacts with downwardly moving catalyst to elutriate the more elutriatable catalyst particles upwardly and out of the bed 12 to a cyclone 40 provided in an upper portion of the reactor vessel 10. Cyclone 40 then separates the catalyst and the gases entrained along with the catalyst to form an overhead stream which passes through overhead conduit 41, and a first portion of catalyst which passes through dipleg 50 to an annular bed 52 located therebelow. The annular bed 52 surrounds an upper portion 53 of the stripper 14. The cyclone overhead stream passes through cyclone overhead conduit 41 to a plenum chamber 42 and exits through a conduit 44. A number of cyclones 40, in parallel or series, may be provided as required. The first portion of catalyst passes from bed 52 into a conduit 54, and then into a second stripper 56. In stripper 56, the more elutriatable catalyst is stripped with a stripping gas introduced via conduit 58 attached to a header 60. After stripping, the more elutriatable catalyst passes through the conduit 62 to the riser 2. Stripped hydrocarbons are discharged from the second stripper 56 through an overhead conduit 63 to reactor vessel 10 and pass to downstream processing, such as fractionation (not shown).

The less elutriatable catalyst continues downwardly through the stripping vessel 14 and contacts perforated trays 16 (baffles), attached to the sidewalls 15 or the riser 2, and trays 17 (baffles) located apart from the sidewalls 15 and riser 2. Trays 16, 17 are annular. Optionally, riser tubes 25 are attached to the trays 17. At least a portion of the more elutriatable catalyst passes upwardly through the tubes 25 to above the stripping vessel 14 and out of the bed 12. Passing the catalyst through the tubes 25 more quickly elutriates catalyst away from the bed, because the elutriated catalyst does not have to overcome the resistance of the bed 12.

The sidewalls 15 are tapered so that the diameter of the sidewalls 15 is less at their bottom than at their top. This results in a higher gas velocity in the lower portion of the stripping vessel 14 than in its upper portion. Thus, there is greater opportunity, in the lower portion of the stripping vessel 14, to elutriate particles that were not elutriated in its upper portion.

After stripping, the less elutriatable catalyst passes through a withdrawal conduit 28 to a regenerator riser 32, where it passes with lift airstream 30 into the regenerator vessel 34 to form flue gas, which exits through a flue gas conduit 38, and regenerated catalyst, which passes through the conduit 36 to the riser 2.

Advantages of the embodiment of FIG. 1 result because the stream of less elutriatable catalyst particles, passing through conduit 28 to the regenerator 34, have a higher ratio of large pore zeolite catalyst particles to intermediate pore zeolite catalyst particles than does the more elutriatable catalyst particles passing through conduit 54 to the second stripper 56. Thus, the present invention minimizes subjecting intermediate pore zeolite catalyst particles to regeneration, and thereby prevents hydrothermal deactivation of the intermediate pore zeolite catalyst particles. Furthermore, because intermediate pore zeolite catalyst particles deactivate less from coking than large pore zeolite catalyst particles, the present invention prevents unnecessarily sending catalyst to the regenerator, thus reducing regenerator duty.

Figure 2:
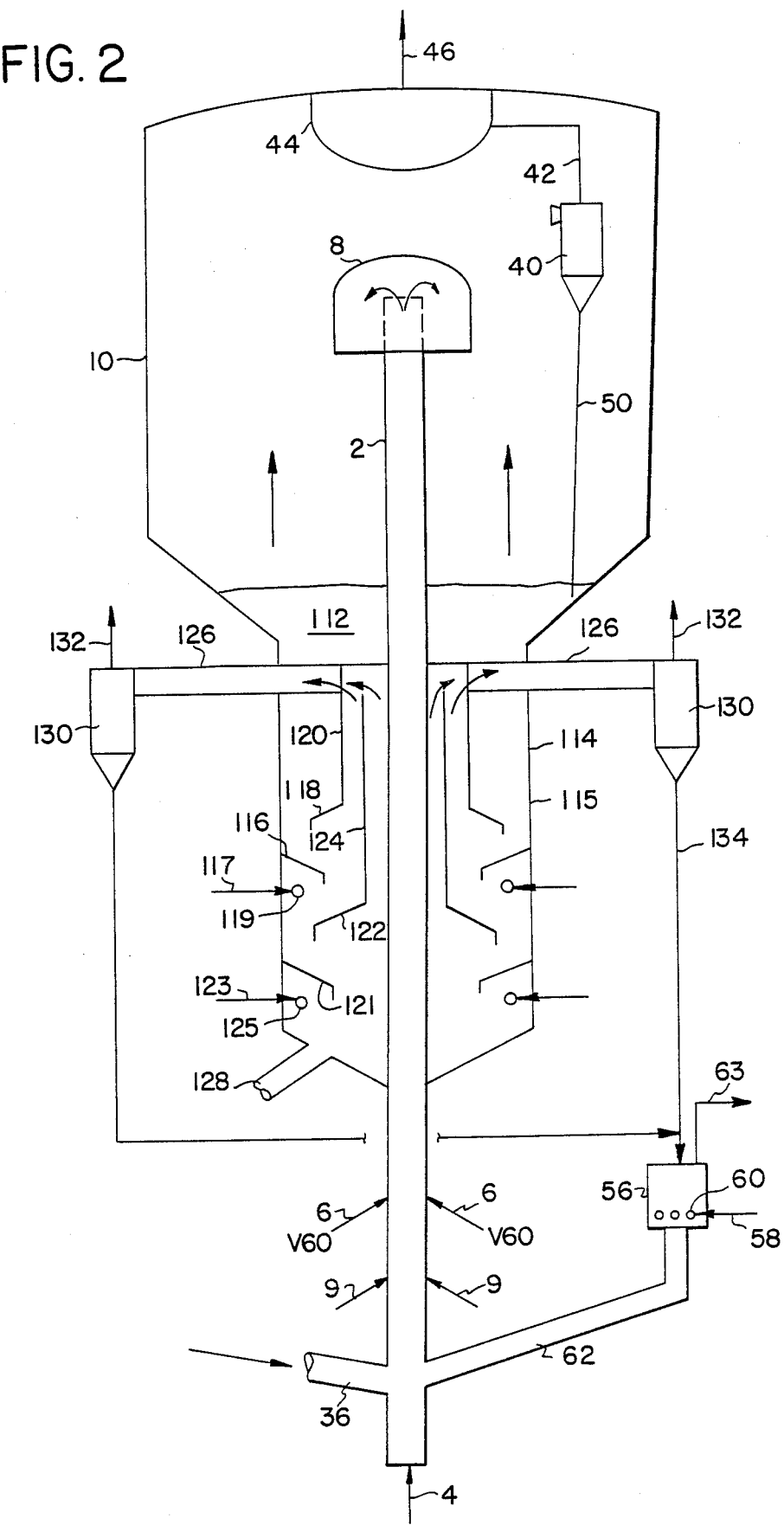
FIG. 2 illustrates a schematic diagram of a fluid catalytic cracking reactor and regenerator of a second embodiment of the present invention.

A second embodiment of the present invention, as shown in FIG. 2, also employs dual-phase fluid catalytic cracking catalyst comprising intermediate pore zeolite catalyst particles and large pore zeolite catalyst particles. The intermediate pore zeolite catalyst particles are more elutriatable than the large pore zeolite catalyst particles to facilitate separating a more elutriatable fraction of zeolite catalyst particles, having a higher ratio of intermediate pore zeolite to large pore zeolite, from a less elutriatable fraction of zeolite catalyst particles having a lower ratio. This allows selective regeneration of the less elutriatable fraction, as discussed below.

As seen in FIG. 2, wherein like-numbered items are the same as those of FIG. 1, catalyst discharges from riser 2 and passes downwardly into a catalyst bed 112 located in a lower portion of the reactor vessel 10. The catalyst in bed 112 passes downwardly through first stripping vessel 114, which is provided with perforated trays 116 (baffles) attached to sidewalls 115 of the stripping vessel 114, as well as a first cylinder 120 and a second cylinder 124. Both cylinders are concentric with the sidewalls 115 and the riser 2. A first inside perforated tray 118 is attached to first cylinder 120 and a second inside perforated tray 122 is attached to second cylinder 124. A top portion of cylinder 124 is inserted into first cylinder 120. A conduit 126 is attached to the first cylinder 120 to be in communication with the inside of both cylinders 120, 124. As more clearly seen in FIG. 3, the first cylinder 120 is provided with a top wall 121 to prevent catalyst from bed 112 from passing into the top of the first cylinder 120.

Catalyst passes downwardly through an annulus between sidewall 115 and cylinder 120 and contacts perforated trays 118 and 116. Stripping gas from a conduit 117 passes into a header 119 located below tray 116, and countercurrently contacts the downwardly passing catalyst to direct a more elutriatable portion of the catalyst upwardly into an annulus between the first cylinder 120 and second cylinder 124. The remaining catalyst continues downwardly and contacts perforated trays 122 and 121. A second stripping gas passes through conduit 123 which is attached to a header 125 located underneath tray 121. The stripping gas countercurrently contacts the downwardly traveling catalyst and directs a more elutriatable portion of the catalyst upwardly into an annulus between cylinder 124 and riser 2. The less elutriatable portion of catalyst continues downwardly and passes out of the stripper through conduit 128 to the regenerator (not shown).

The upwardly traveling more elutriatable catalyst portions pass in parallel, through the annulus between the first and second cylinders 120, 124 and the annulus between second cylinder 124 and riser 2, to the conduit 126. The catalyst then passes from the conduit 126 to cyclones 130, which separate gaseous material from the more elutriatable catalyst. Two to eight cyclones 130 would be typically provided. The gaseous material passes through overhead conduits 132 to reactor vessel 10 and subsequent to downstream processing, such as fractionation (not shown). The separated catalyst passes through diplegs 134 to the second stripping vessel 56 and then recycles to the riser 2. The more elutriatable catalyst in conduit 126 has a higher ratio of intermediate pore zeolite catalyst particles to large pore zeolite catalyst particles than does the less elutriatable catalyst which exits the first stripping vessel through conduit 128. The advantage of the embodiment of FIG. 2 is that the more elutriatable catalyst particles within bed 112 can freely pass upwardly through cylinders 120, 124 and conduit 126 in bed 112, rather than having to push all the way through the catalyst bed 112. The free passing results in quicker and more efficient separation of more elutriatable catalyst from less elutriatable catalyst.

Figure 3:
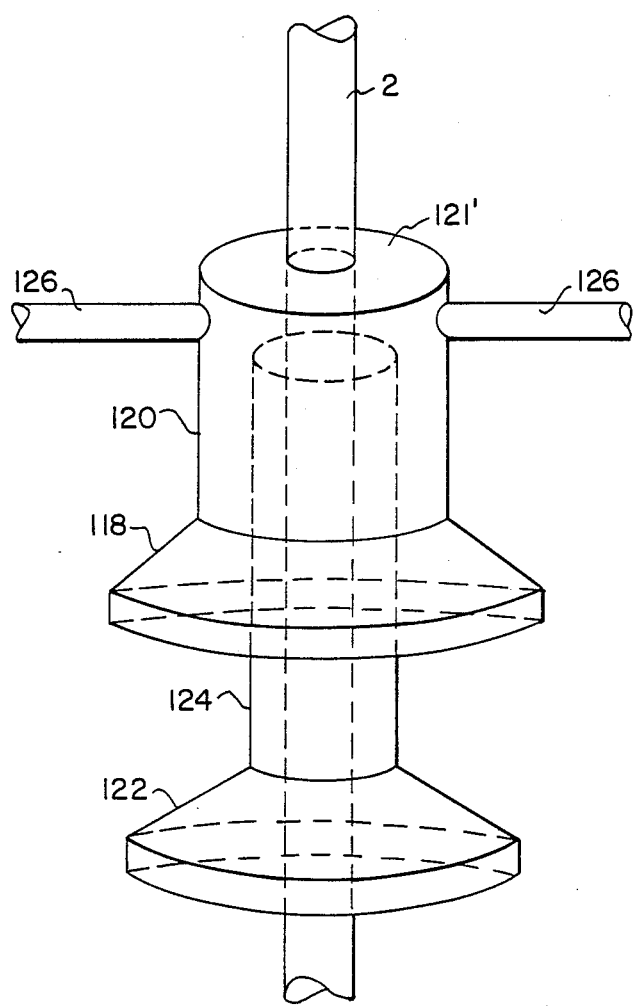
FIG. 3 illustrates a perspective view of a portion of FIG. 2.
Figure 4:
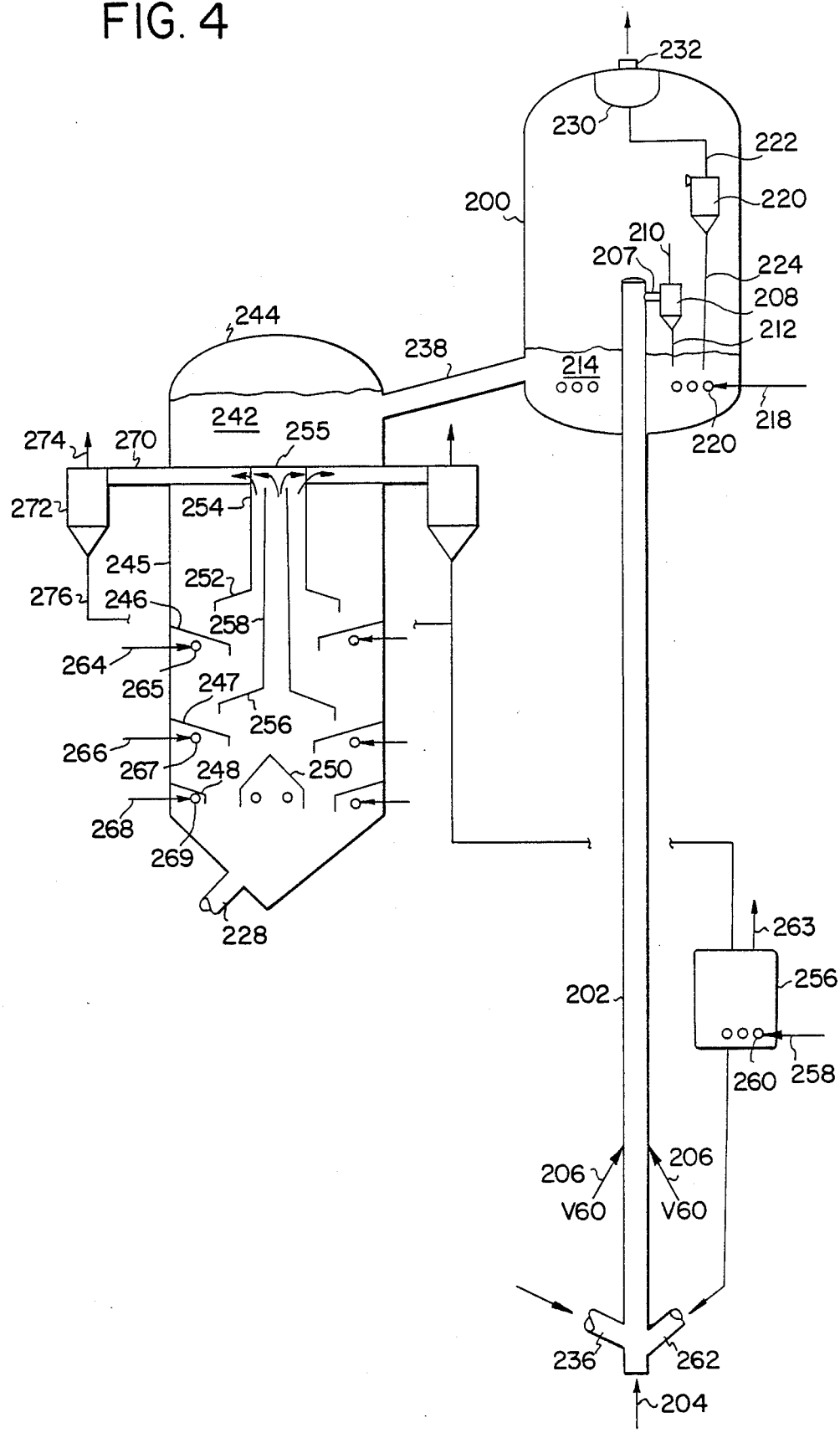
FIG. 4 illustrates a schematic diagram of a fluid catalytic cracking reactor and regenerator of a third embodiment of the present invention.

FIG. 4 shows a third embodiment of the present invention, which employs a stripping vessel 244 which is external to a reactor vessel 200, but has cylinders and trays similar to those of the embodiment of FIGS. 2 and 3. As seen in FIG. 4, a mixture of catalyst from conduit 236, which is attached to a regenerator (not shown), catalyst from conduit 262 and a lift gas stream 204 pass upwardly through a riser 202. A vacuum gas oil (VGO) stream 206 is added to the mixture and the mixture, including VGO, continues upwardly through the riser which terminates within the reactor vessel 200. Preferably, the lift gas 204 contains $C_2$-$C_4$ olefins. Most preferably, the lift gas 204 contains ethylene and an optional feedstream 209, comprising olefins having 3 to 4 carbon atoms, is injected into the riser 202 between where the lift gas 204 and VGO stream 206 pass into the riser. The mixture discharges from the riser 202 through a riser cyclone inlet conduit 207 into a riser cyclone 208. The cyclone 208 separates gasiform material, which passes through an overhead conduit 210, from the catalyst, which passes through a dipleg 212 to a catalyst bed 214 therebelow. The gasiform material from overhead conduit 210 passes to a cyclone 220 in which it separates into a catalyst stream, which passes through dipleg 224 to bed 214 therebelow, and a gasiform stream. The gasiform stream passes upwardly through a conduit 222 to a plenum chamber 230, and upwardly from the plenum chamber 230 through conduit 232 out of the reactor vessel 200 to downstream processing, such as fractionation (not shown).

Catalyst in bed 214 contacts a stripping gas provided by stripping gas conduit 218 attached to a header 219. The stripped catalyst passes through a withdrawal conduit 238 to a catalyst bed 242 located within a stripping vessel 244 having sidewalls 245.

The stripping vessel 244 contains a first cylinder 254 attached to a first inside perforated tray 252 and having a top wall 255, a second cylinder 258 attached to a second inside perforated tray 256, and annular outer perforated trays 246, 247 attached to the sidewalls 245. The catalyst in bed 242 passes downwardly through the vessel 244 and contacts trays 252 and 246. Stripping gas provided by a stripping gas conduit 264, attached to a header 265 located underneath tray 246, provides stripping gas which passes through perforated tray 246 to countercurrently contact the downwardly passing catalyst and to separate a first more elutriatable portion of catalyst which passes upwardly through an annulus between the first and second cylinders 254 and 258. The remaining less elutriatable catalyst continues downwardly and contacts the perforated trays 256 and 247.

Stripping gas provided by a conduit 266, attached to a stripping gas header 267, passes through the tray 247 to countercurrently contact with the catalyst and to separate a second more elutriatable portion of catalyst which passes upwardly through cylinder 258. The remaining less elutriatable catalyst continues downwardly, where it contacts a conical perforated tray 250 and annular perforated tray 248. Trays 248 and 250 are provided with stripping gas by a conduit 268 attached to a header 269. The stripping gas passes through the trays 248 and 250 to countercurrently contact the less elutriatable catalyst to separate a third more elutriatable portion of catalyst which passes upwardly through second cylinder 258. The remaining less elutriatable catalyst passes downwardly through conduit 228, attached to vessel 244, to a regenerator vessel (not shown).

The more elutriatable portions of catalyst pass upwardly in parallel through the cylinders 254, 258 to one or more cyclone inlet conduits 270, which is attached to an upper portion of first cylinder 254 and in communication with the inside of both cylinders 254, 258. The more elutriatable catalyst passes through the conduit 270 to a cyclone 272 which separates gaseous material from the catalyst. The gaseous material passes upwardly through a cyclone withdrawal conduit 274 to reactor vessel 200 and passes to downstream processing, such as fractionation (not shown). The separated catalyst passes through a dipleg 276 to a second stripping vessel 256, where it contacts with stripping gas provided by a conduit 258 attached to a stripping gas header 260 to produce a stripped catalyst stream which recycles through conduit 262 to the riser 202, and a gaseous effluent which passes through a conduit 263 to reactor vessel 200 to downstream processing, such as fractionation (not shown).

The less elutriatable catalyst in conduit 228 has a higher ratio of large pore zeolite catalyst particles to intermediate pore zeolite catalyst particles than does the less elutriatable catalyst in conduit 270. The great advantage of the system of FIG. 4 is that it permits easy retrofit of systems presently employing a stripping vessel 244 separate from a reactor vessel 200. Furthermore, stripping vessel 244 provides efficient separation of more elutriatable particles from less elutriatable particles because the separated particles pass freely and upwardly through the cylinders 254, 258, rather than having to push all the way through the catalyst bed 242.

The above description, and the accompanying drawings, are merely illustrative of the application of the principles of the present invention and are not limiting. Numerous other arrangements which employ the principles of the invention and which fall within its spirit and scope may be readily devised by those skilled in the art. Accordingly, the invention is not limited by the foregoing description, but is only limited by the scope of the appended claims.

We claim:

1. A fluid catalytic cracking process, comprising the steps of:
    introducing particles comprising large pore crystalline zeolite cracking catalyst, particles comprising intermediate pore crystalline zeolite cracking catalyst, and a lift gas into a first zone of a fluid catalytic cracking reactor riser, wherein said large port particles require more frequent regeneration and are more hydrothermally stable than said intermediate pore catalyst, at least one physical characteristic of said intermediate pore particles and said large pore particles differing sufficiently, such that said intermediate pore particles are more elutriatable than said large pore particles;
    introducing a hydrocarbon feedstock having an initial boiling point of at least 400° F. into a second zone of said riser to form a mixture under fluid catalytic cracking conditions, said second zone being located downstream of said first zone;
    discharging said mixture from said riser and passing a stream comprising said catalyst of said mixture to a first catalyst stripping vessel;
    countercurrently contacting said mixture catalyst in said first stripping vessel with upwardly passing stripping gas to upwardly direct a first portion of said catalyst;
    passing said first portion of said catalyst out of said first stripping vessel and passing a remaining portion of said catalyst downwardly through said first stripping vessel, said first portion having a higher ratio of intermediate pore catalyst to large pore catalyst than said remaining portion;
    stripping said first portion in a second stripping vessel;
    regenerating said remaining portion of catalyst in a fluid catalytic regenerator; and recycling said first portion from said second stripping vessel, and said remaining portion from said regenerator, to said reactor riser, wherein said riser terminates within a reactor vessel and said first stripping vessel is located within a lower portion of said reator vessel and defined by sidewalls which are concentric with said riser, wherein said catalyst of said mixture in said first stripping vessel passes downwardly through a first annulus between a cylinder and said sidewalls;

said catayst of said mixture passes across a perforated tray attached to said cylinder;

said first portion of catalyst passes upwardly through a second annulus between said cylinder and said riser; and said first portion passes from said second annular zone to said second stripping vessel.

2. The process of claim 1, wherein siid lift gas comprises olefins having 2 to 4 carbon atoms.

3. The process of claim 2, wherein said hydrocarbon feedstock is a vacuum gas oil.

4. The process of claim 3, wherein said large pore zeolite is selected from the group consisting of zeolite X, Y, REY, USY, US-REY, mordenite and faujasite, and said intermediate pore zeolite is selected from the group consisting of ZSM-5, ZSM-11, ZSM-12, ZSM-23, ZSM-35, ZSM-38 and ZSM-48.

5. The process of claim 4, wherein said large pore zeolite is a member of the group consisting of zeolite X and zeolite Y.

6. The process of claim 5, wherein said intermediate pore zeolite is ZSM-5.

7. The process of claim 6, wherein said large pore particles are denser than said intermediate pore particles.

8. The process of claim 6, wherein said large pore particles have a larger average particle size distribution than said intermediate pore particles.

9. The process of claim 8, wherein said large pore particles are denser than said intermediate pore particles.

10. The process of claim 6, wherein said large pore particles are more irregularly-shaped than said intermediate pore particles.

11. The process of claim 1, wherein said catalyst in said first stripping vessel passes over outer perforated trays attached to said sidewalls and inner perforated trays attached to said riser, and said sidewalls are tapered to have a larger diameter at their top than at their bottom.

12. A fluid catalytic cracking process, comprising the steps of:

introducing particles comprising large pore crystalline zeolite having the structure of a member of the group consisting of zeolite X and zeolite Y, particles comprising intermediate pore crystalline zeolite having the structure of ZSM-5, and a lift gas comprising olefins having 2 to 4 carbon atoms into a first zone of a fluid catalytic cracking reactor riser, said intermediate pore particles being sufficiently less dense than said large pore particles to be more elutriatable than said large pore particles, wherein said large pore particles require more frequent regeneration and are more hydrothermally stable than said intermediate pore particles;

introducing a hydrocarbon feedstock having an initial boiling point of at least 400° F. into a second zone of said riser to form a mixture under catalytic cracking conditions, said second zone being located downstream of said first zone;

discharging said mixture from said riser into a fluid catalytic cracking reactor vessel and passing said mixture to a first catalyst stripping vessel located in a lower portion of said vessel and defined by reactor vessel sidewalls;

countercurrently contacting said mixture with stripping gas in said first stripping zone, while passing said mixture downwardly through a first annulus between said sidewalls and a first cylinder, and passing said mixture across a perforated tray attached to said cylinder;

upwardly directing a first portion of said catalyst from said mixture, by said contact with said stripping gas, through a second annulus between said first cylinder and said riser;

passing a remaining portion of said catalyst from said mixture downwardly through said first stripping vessel, said first portion having a higher ratio of intermediate pore zeolite particles to large pore zeolite particles than said remaining portion;

stripping said first portion in a second catalyst stripping vessel;

regenerating said remaining portion in a fluid catalytic regenerator; and recyling said first portion from said second stripping vessel, and said remaining portion from said regenerator, to said reactor riser.

13. A fluid catalytic cracking process, comprising the steps of:

introducing particles comprising large pore crystalline zeolite cracking catalyst, particles comprising intermediate pore crystalline zeolite cracking catalyst, and a lift gas into a first zone of a fluid catalytic cracking reactor riser, wherein said large pore particles require more frequent regeneration and are more hydrothermally stable than said intermediate pore catalyst, at least one physical characteristic of said intermediate pore particles and said large pore particles differing sufficiently, such that said intermediate pore particles are more elutriatable than said large pore particles;

introducing a hydrocarbon feedstock having an initial boiling point of at least 400° F. into a second zone of said riser to form a mixture under fluid catalytic cracking conditions, said second zone being located downstream of said first zone;

discharging said mixture from said riser and passing a stream comprising said catalyst of said mixture to a first catalyst stripping vessel;

countercurrently contacting said mixture catalyst in said first strippin vessel with upwardly passing stripping gas to upwardly direct a first portion of said catalyst;

passing said first portion of said catalyst out of said first stripping vessel and passing a remaining portion of said catalyst downwardly through said first stripping vessel, said first portion having a higher ratio of intermediate pore catalyst to large pore catalyst than said remaining portion;

stripping said first portion in a second stripping vessel;

regenerating said remaining portion of catalyst in a fluid catalytic regenerator; and recycling said first portion from said second stripping vessel, and said remaining portion from said regenerator, to said reactor riser, wherein said riser terminates within a reactor vessel and said first stripping zone is outside said reactor vessel, wherein said catalyst of said mixture in said first stripping vessel passes downwardly through a first annulus between a first cylinder and said sidewalls; said catalyst of said mixture passes across a perforated tray attached to said first cylinder; and said first portion of catalyst passes upwardly through a second annulus between said first and second cylinders and upwardly through said second cylinder.

* * * * *